United States Patent

Staudhammer et al.

[15] 3,691,623
[45] Sept. 19, 1972

[54] PROCESS FOR INCREASING THE WHISKER AND FIBER CONTENT IN A MATRIX

[72] Inventors: Karl P. Staudhammer; Vernon H. Reineking, both of Gardena, Calif.

[73] Assignee: TRW Inc., Redondo Beach, Calif.

[22] Filed: Oct. 9, 1970

[21] Appl. No.: 79,560

[52] U.S. Cl. ..................29/472.3, 29/191.2, 29/419, 29/471.1
[51] Int. Cl. ...............................................B23k 31/02
[58] Field of Search........29/471.1, 472.3, 419, 191.2

[56] References Cited

UNITED STATES PATENTS

| | | |
|---|---|---|
| 3,303,006 | 2/1967 | Morley et al. ..............29/419 |
| 3,371,407 | 3/1969 | Forsyth et al. ........29/472.3 X |
| 3,419,952 | 1/1969 | Carlson.................29/472.3 X |
| 3,437,457 | 4/1969 | Fisher.........................29/419 |
| 3,443,301 | 5/1969 | Basche et al..........29/191.2 X |
| 3,593,409 | 7/1971 | Silverstein...................29/488 |
| 3,455,662 | 7/1969 | Alexander et al. .......29/191.6 |

*Primary Examiner*—John F. Campbell
*Assistant Examiner*—Richard Bernard Lazarus
*Attorney*—Daniel T. Anderson, James V. Tura and Alan D. Akers

[57] ABSTRACT

A process for increasing the whisker content in a matrix comprises the steps of aligning and depositing reinforcing whiskers on a metal substrate, stacking layers of these substrates into a preform assembly, diffusion bonding this assembly to consolidate the preforms into a composite foil and heating the composite 50° to 100° F. above its melting point, while applying a slight pressure thereto. Consequently, some of the molten matrix is forced out from the edges of the composite. This results in a thinner composite foil having a higher whisker concentration and consequent higher ultimate tensile strength.

7 Claims, 4 Drawing Figures

Karl P. Staudhammer
Vernon H. Reineking
INVENTORS

Karl P. Staudhammer
Vernon H. Reineking
INVENTORS

PROCESS FOR INCREASING THE WHISKER AND FIBER CONTENT IN A MATRIX

BACKGROUND OF THE INVENTION

This invention relates to a new and improved process for producing whisker and fiber loaded metal matrices. More specifically, this invention relates to a process for producing highly concentrated whisker loaded metal foils in a continuous process without the necessity for expensive equipment or vacuum forming apparatus.

A fiber is defined as an elongated particle of micron-sized diameter, with a length to diameter ratio of over 10 to 1. The fiber material may be non-crystalline, single crystal, or polycrystalline in nature. A whisker by definition is a single crystal fiber with a high degree of crystalline perfection which attributes to its ultra-high strengths (above $10^6$ pounds per square inch). Whiskers by nature of their growth are short, their cross-sections are in the micron range, and their length to diameter ration usually ranges from approximately 200 to 10,000.

Processes for the production of reinforced metal matrices are essentially of a batch type, and involve either the extrusion of aligned whiskers followed by a compaction step, or the infiltration of magnetically aligned whiskers into a molten metal matrix followed by vacuum compression and heating.

The problems involved in both these processes is that expensive extrusion equipment is required; additionally, vacuum forming apparatus is necessary, and the overall process is essentially a batch type operation. Obviously, it would be desirable to convert the process into a continuous operation while eliminating the need for an extruder and the vacuum forming equipment and still maintain the tensile strength properties of the reinforced metal matrix.

Accordingly, it is an object of this invention to provide a process for producing fiber and whisker reinforced metal matrices.

Another object is to provide a process for the continuous production of these reinforced metal matrices.

Another object is to provide a process for the production of these reinforced metal matrices without the necessity for extrusion equipment and vacuum apparatus.

Other objects of the invention will become apparent from the description and the diagrams to follow.

THE INVENTION

According to the invention, a composite sheet is first formed by consolidating aligned whiskers and fibers into a molten metal matrix. The composite sheet is heated 50° to 100° F. above its melting point and then compressed. This causes some of the molten matrix to be squeezed out from the edges of the composite; the thickness of the composite is consequently reduced and the whisker and fiber loading of the composite is increased. Preferably, the edges of the composite sheet are maintained below its melting point; this restrains the molten matrix from flowing out at random and maintains the composite at its original size. It is necessary to apply only a slight pressure to the sheet to force the molten matrix through the edge of the sample leaving behind the fibers and whiskers. This technique minimizes fiber and whisker damage since the pressure is applied to a molten or liquid medium. It will be appreciated that this process differs from conventional extrusion methods because the molten material is not forced through any die or orifice but is simply squeezed through the edges or periphery of the opposite sheet.

Many types of fibers and whiskers can be employed in the process for this invention and include alpha and beta silicon carbide, molybdenum, silica, tungsten, boron, alumina, beryllium oxide, silicon nitride, boron carbide, etc. In cross-section, the crystals are polyhedrons and have a diameter in the range of 1–20$\mu$. The diameter of the crystals can be considered as the diameter of the circle drawn tangent to the sides of the polyhedron defining the cross-section of the crystal. The crystals are usually at least 100$\mu$ in length and for use as strength reinforcing elements, they should have a length to diameter ratio of at least 10 to 1.

Metals which may be employed as matrices in this invention include: nickel, aluminum, molybdenum, nichrome alloys, stainless steel, silver, titanium, titanium alloys, aluminum alloys, magnesium and magnesium alloys, copper and copper alloys, lead and lead alloys, etc.

The process of this invention will become more apparent from the description and the diagrams to follow in which.

EXAMPLE

Silicon carbide whiskers were applied to an aluminum foil by passing the foil through a suspension of silicon carbide whiskers in an amyl acetate solution containing about 0.01 percent by weight of pyroxylin, which is a trade namer of the E. I. duPont de Nemours Co. Ltd. for lacquer grey nitro cellulose binder material. If desired, the silicon carbide whiskers may be aligned, such as by an electric field.

Layers of the whisker coated foils were then laminated by diffusion bonding to form a rigid integral structure. Other well known methods of forming laminated structures, such as hot rolling, may also be employed.

A typical diffusion bonding process comprises subjecting from about 100–600 layers of aluminum foil reinforced with silicon carbide whiskers to pressures of from about 1,000–2,000 psi at temperatures of about 1,000°–1,200° F. for 5 to 10 minutes. Higher pressures should be avoided to prevent rupturing of the fibers.

The temperatures employed should be in excess of one-half, but below the melting temperature of the matrix material.

The method of applying the alpha silicon fibers to the aluminum foil and further details concerning the diffusion bonding process for laminating a plurality of whisker coated laminates together to form a composite is disclosed in more further detail in U.S. Ser. No. 714,901 in the names of M. E. Kirkpatrick, J. L. Reger, and K. P. Staudhammer, and filed Mar. 21, 1968.

Figure 1:
FIG. 1 is a photomicrograph at a magnification of 1,500 of $\alpha$-silicon carbide whiskers in an aluminum matrix which was fabricated below the melting temperature of the matrix.

FIG. 1 shows the composite produced by this process, and it will be observed that the laminar boundaries or interfaces between the laminar sheets are not clearly discernable. This is due to the fact that the foils are diffused together to form an integral unit of matrix material with the whiskers and and fibers embedded therein.

Figure 3:
FIG. 3 is an electron micrograph taken at a magnification of 12,000 showing $\alpha$-silicon carbide whiskers in an aluminum matrix, which was fabricated below the melting temperatures of the matrix. The scale between the marks is 1$\mu$.

FIG. 3 shows the integrity of the bond between the whiskers and the aluminum matrix in more detail.

Figure 2:
FIG. 2 is an electron micrograph showing the size distribution of the $\alpha$-silicon carbide whiskers employed in the aluminum matrix. The magnification is 7,500 and the scale is 1$\mu$ = 7.5 mm.

The variation in whisker length and in diameter which may be employed in this invention is shown in FIGS. 2 and 3, and it will be observed that a considerable variation is possible.

In the inventive feature of this process, excess aluminum matrix is then removed from the composite shown in FIG. 3 by heating the composite to about 50° to 100° above the melting point of the matrix (in this case, aluminum) and then applying a small amount of pressure to force some of the matrix (i.e., aluminum) out from edges of the composite.

Figure 4:
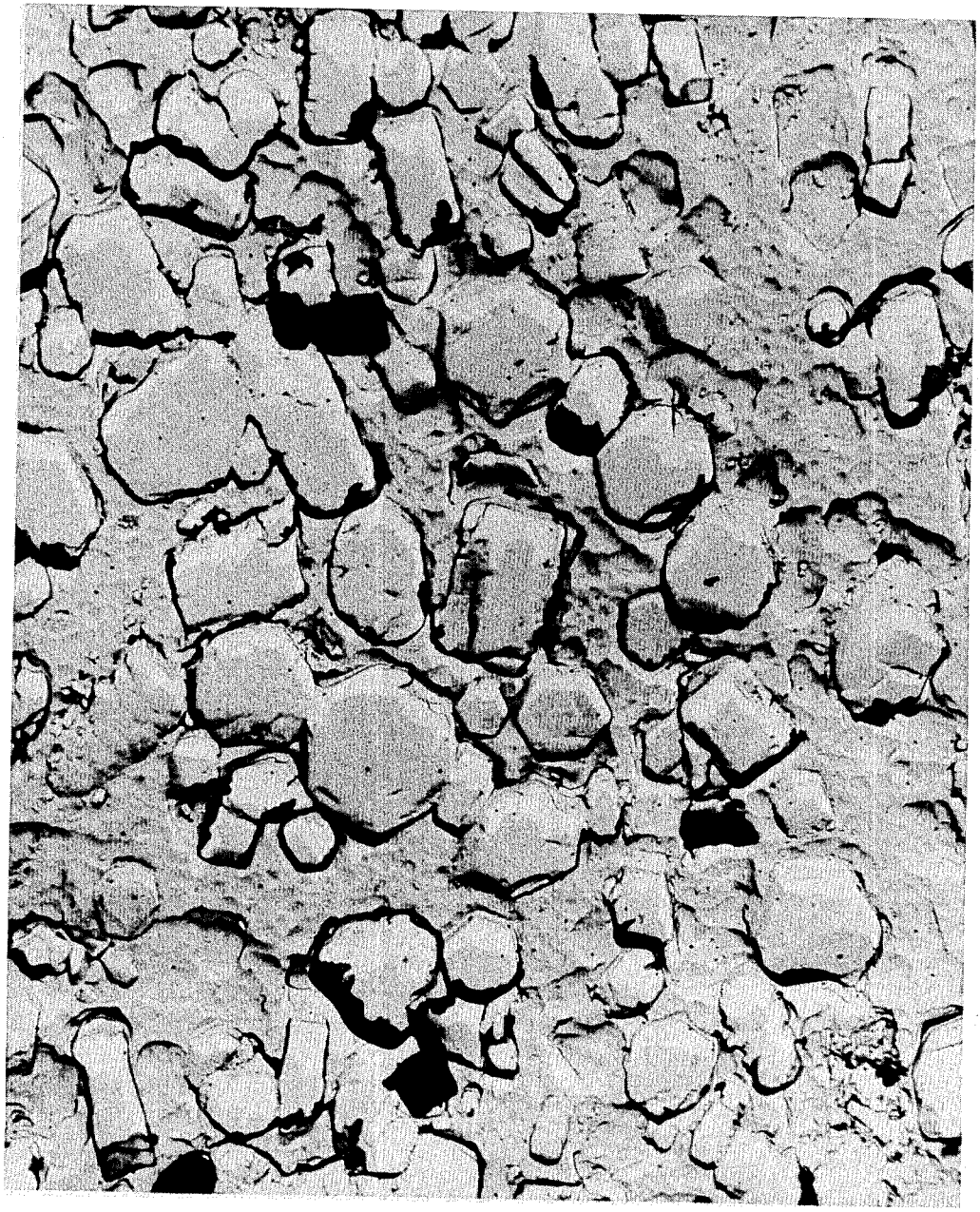
FIG. 4 is an electron micrograph similar to FIG. 3 showing the increase in whisker content following removal of excess molten matrix from the composite when produced by the process of this invention. The scale, magnification, whisker composition and matrix are the same as in FIG. 3.

The electron micrograph shown in FIG. 4 indicates that removal of excess matrix from the composite does not adversely affect either the composite bonding or impair the whisker structure. For example, there is no evidence of broken fibers, or of fiber separation from the matrix which would indicate imperfect bonding. Furthermore, the fact that no distortion was produced in the crystal orientation with respect to the original alignment indicates the alignment was unimpaired.

Further confirmation of the effective bonding between the fibers and whiskers and matrix is shown in the following table, which compares loading versus ultimate tensile strength for $\alpha$-SiC in aluminum. For loading of about 6 to 16 percent shown in Examples 1-3, ultimate tensile strengths of about 17,000 to about 18,500 psi were attained. However, when employing the process of this invention, shown in Examples 4 and 5, a loading of about 40 percent was attained; this produced an increase in ultimate tensile strength to about 35,000 to 39,000 psi. This gain in tensile strength was achieved even though the thickness of the composite was reduced significantly.

TABLE I

| Ex. | width (in.) | Thick (in.) | Area (in²) | Whisker Loading | Ultimate Load (psi) | Modulus (× 10⁶ psi) | V.T.S. (psi) |
|---|---|---|---|---|---|---|---|
| 1 | .3726 | .1281 | .0477 | 36% | 884 | 12.6 | 18,500 |
| 2 | .3726 | .1263 | .0470 | 11.5% | 825 | 14.5 | 17,500 |
| 3 | .3720 | .0436 | .0162 | 16% | 275 | 8.5 | 16,950 |
| 4 | .3613 | .0512 | .0185 | 40% | 644 | 12.0 | 34,810 |
| 5 | .3608 | .0523 | .0189 | 40% | 743 | 13.6 | 39,370 |

The present invention thus discloses a reasonably simple process for achieving whisker loadings of about 40 to about 75 percent in metal composites without requiring complicated equipment, such as vacuum forming apparatus, extrusion equipment, etc. Also, both the integrity of the bond between the whiskers and fibers and the final composite remains unimpaired and the whisker structure itself is not damaged by the process. Furthermore, the process permits the use of relatively short whiskers compared to prior art processes and still preserves their original alignment from the deposition process. This enables a simpler alignment process to be employed such as is shown in the aforementioned U.S. Ser. No. 714,901.

This eliminates the need for expensive processing techniques to maintain the whiskers in alignment, such as by coating them with a magnetic material.

We claim:

1. A process for increasing the whisker and fiber content in a metal matrix comprising:
   the steps of depositing reinforcing whiskers and fibers onto a metal substrate;
   stacking layers of these substrates to provide a preform assembly;
   bonding the assembly to form a composite foil, and
   heating the foil about 50°–100° F. above the melting point of the metal substrate while applying a slight pressure to force molten matrix from the composite while maintaining the edges of the composite foil below the melting point; the whisker and fiber loading in the composite ranging from about 40–75%.

2. A process for increasing the whisker and fiber content in a metal matrix comprising:
   the steps of aligning and depositing reinforcing whiskers and fibers onto a metal substrate;
   stacking layers of these substrates to provide a preform assembly;
   bonding the assembly to form a composite foil, and
   heating the foil about 50°–100° F. above the melting point of the metal substrate while applying a slight pressure to force molten matrix from the composite while maintaining the edges of the composite foil below the melting point; the whisker and fiber loading in the composite varying from about 40–75 percent.

3. A process for increasing the whisker and fiber content in a metal matrix comprising:
   the steps of depositing reinforcing whiskers and fibers onto a metal substrate;
   stacking layers of these substrates to provide a preform assembly;
   bonding the assembly to form a composite foil; heating the foil about 50°–100° F. above the melting point of the metal substrate while maintaining the edges of the composite foil below the melting point, and
   applying a slight pressure to the foil to force molten matrix from the composite; the whisker and fiber loading of the composite varying from about 40–75%.

4. The process of claim 1 in which the layers are diffusion bonded to form the composite foil.

5. The process of claim 2 in which the layer are diffusion bonded to form the composite foil.

6. The process of claim 1 in which the fibers and whiskers are α-SiC and the matrix is aluminum.

7. The process of claim 2 in which the fibers and whiskers are α-SiC and the matrix is aluminum.

* * * * *